United States Patent
Guiragossian et al.

(10) Patent No.: US 6,943,864 B2
(45) Date of Patent: Sep. 13, 2005

(54) LIQUID CRYSTAL DISPLAY OPTICAL HEAD WITH A HEAT SINK

(75) Inventors: Nicloas Guiragossian, Merignac (FR); Guy Meyer, St Medard en Jalles (FR)

(73) Assignee: Thales, Paris (FR)

( * ) Notice: Subject to any disclaimer, the term of this patent is extended or adjusted under 35 U.S.C. 154(b) by 0 days.

(21) Appl. No.: 10/432,285

(22) PCT Filed: Jul. 6, 2001

(86) PCT No.: PCT/FR01/02190
§ 371 (c)(1),
(2), (4) Date: May 20, 2003

(87) PCT Pub. No.: WO02/04859
PCT Pub. Date: Jan. 17, 2002

(65) Prior Publication Data
US 2004/0218106 A1 Nov. 4, 2004

(30) Foreign Application Priority Data
Jul. 11, 2000 (FR) .............................. 00 09051

(51) Int. Cl.⁷ .................. G02F 1/1333; F21V 29/00
(52) U.S. Cl. ...................... 349/161; 349/58; 349/59; 362/294
(58) Field of Search ............... 349/58, 59, 60, 349/67, 70, 161; 362/294

(56) References Cited

U.S. PATENT DOCUMENTS

| | | | |
|---|---|---|---|
| 4,281,238 A | * | 7/1981 | Noma et al. ............... 219/535 |
| 4,963,414 A | * | 10/1990 | LeVasseur et al. ....... 428/195.1 |
| 4,985,815 A | | 1/1991 | Endo |
| 5,161,041 A | * | 11/1992 | Abileah et al. ............... 349/62 |
| 5,432,626 A | * | 7/1995 | Sasuga et al. ................ 349/58 |
| 5,612,593 A | | 3/1997 | Olson |
| 5,726,722 A | | 3/1998 | Uehara et al. |
| 5,791,770 A | | 8/1998 | Hoyt et al. |

FOREIGN PATENT DOCUMENTS

| | | | | |
|---|---|---|---|---|
| EP | 0455886 A2 | | 11/1991 | |
| JP | 06202103 | * | 7/1994 | ......... G02F/1/1335 |
| JP | 7219069 A | | 8/1995 | |

OTHER PUBLICATIONS

Katou, JP 06–202103, Jul. 1994, machine translation.*

* cited by examiner

*Primary Examiner*—Andrew Schechter
(74) *Attorney, Agent, or Firm*—Lowe Hauptman & Berner, LLP

(57) ABSTRACT

The invention relates to the field of liquid crystal optical display heads.

Figure 1:
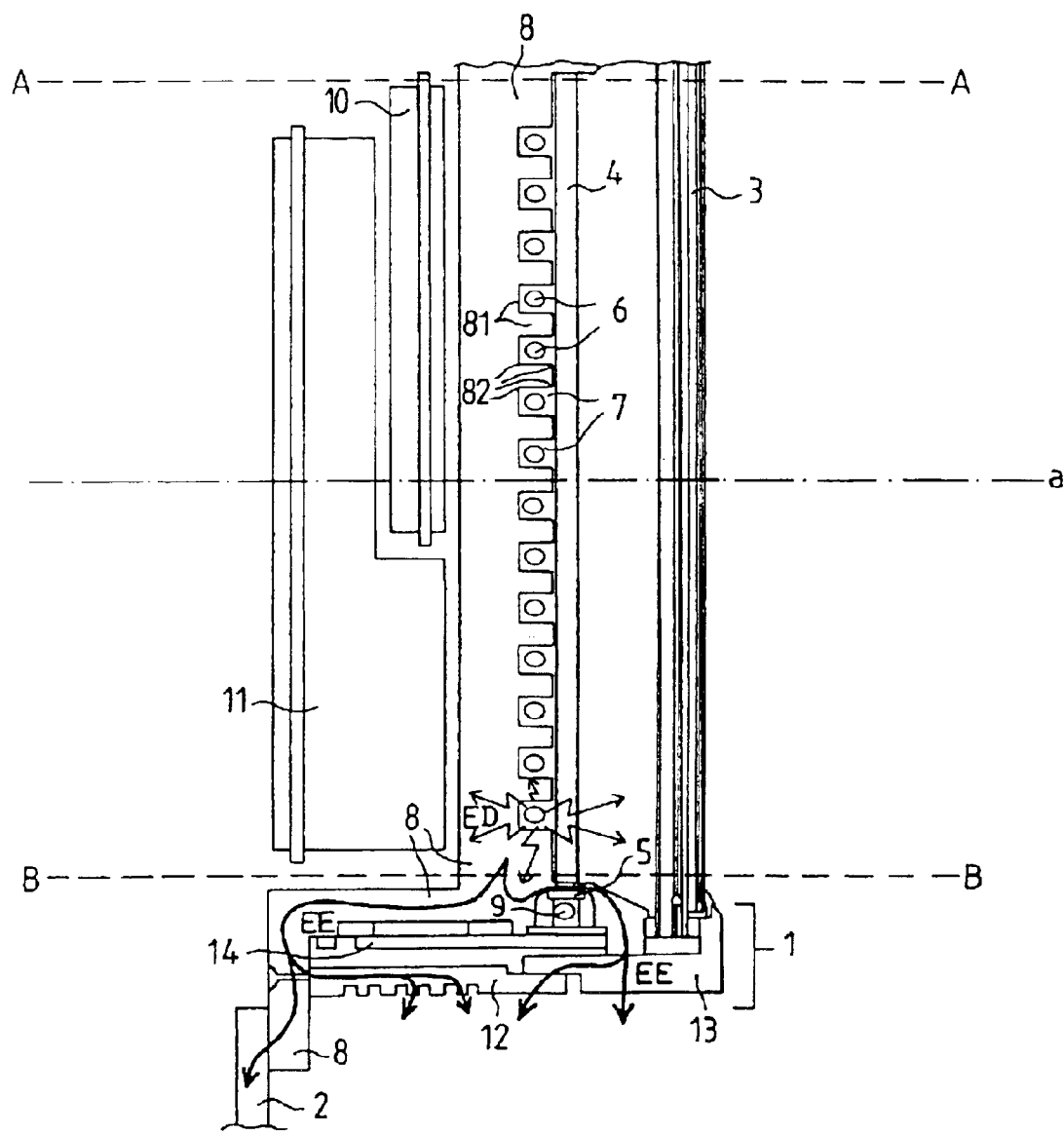

The invention is a liquid crystal optical display head comprising a casing (1) in which there are one or more lamps (6), one or more covers (7) surrounding the lamp or lamps (6) and at least one heat sink (8), the heat sink (8) being made as one piece from a heat conducting material and directly connecting the cover or covers (7) to the outside of the casing (1).

The invention may especially be applied to liquid crystal optical display heads mounted on an aircraft instrument panel.

19 Claims, 1 Drawing Sheet

LIQUID CRYSTAL DISPLAY OPTICAL HEAD WITH A HEAT SINK

RELATED APPLICATIONS

The present application is based on International Application No. PCT/FR01/02190 filed Jul. 6, 2001, and claims priority from French Application No. 0009051 filed Jul. 11, 2000, the disclosure of which is hereby incorporated by reference herein in its entirety.

The invention relates to the field of liquid crystal optical display heads. Liquid crystal optical display heads, with their associated electronic card trays, are mostly used in aircraft instrument panels but may also be used in other types of devices. The liquid crystal display head is typically the part facing the pilot, that is to say the part seen by the pilot. The display head generally comprises two main parts, the assembly comprising the liquid crystal matrix, and the light box. The assembly comprising the liquid crystal matrix comprises at least one liquid crystal screen on which information that the pilot can see or read is displayed. The light box is the light source comprising one or more elementary light sources whose function is to illuminate the assembly comprising the liquid crystal matrix.

In a liquid crystal optical display head, which, in the rest of the text, could more simply be called an optical display head or even optical head, the light transmission of the assembly comprising the liquid crystal matrix is low, typically of the order of a few percent. Consequently, in order to provide good brightness to the screen seen by the pilot, that is to say in order to guarantee good visual comfort to the pilot, the light box emits, and consequently dissipates, considerable energy. Now, this energy dissipated as heat from the elementary light sources must be extracted outside the casing of the optical display head.

According to a prior art, the optical display head comprises a heat sink located around the elementary light sources, which are generally lamps. A plastic crenellated part, in which the lamps are held, is connected to the heat sink, next to the lamps. On the side away from these lamps, the heat sink comprises metal ventilation fins. The structure of the heat sink is parallelepipedal and the heat sink is "in air", that is to say that the attachment of the heat sink to the structure of the optical head is via several mechanical connection components such as spacers, screws, etc., the heat sink remaining inside the casing of the optical head, therefore being indirectly attached to this casing. The energy dissipated as heat from the lamps, or more specifically, a good part of this energy, is extracted by the heat sink, more specifically by the fins of the heat sink by forced convection. This forced convection is provided by forced ventilation. The forced ventilation is provided either by a fan attached to the liquid crystal display, or by a connection to the on-board fluid system of the aircraft.

The problem which the invention aims to solve is that of decreasing or even removing the forced ventilation from the optical display head, which would make it possible at least to decrease, or even to remove the forced ventilation dedicated to the liquid crystal display.

The invention proposes a solution based on improving the heat conduction from the heat sink, allowing the removal of the forced ventilation dedicated to the optical display head. The heat conduction from the heat sink is improved enough that the presence of "thermal fuses" in the optical display head, such as a polarizer for example, does not disturb the operation of the optical display head as would a "tripped thermal fuse".

According to the invention, provision is made for a liquid crystal optical display head comprising a casing in which there are one or more lamps, one or more covers surrounding the lamps and at least one heat sink, characterized in that the heat sink is made as one piece from a heat conducting material and directly connects the cover or covers to the outside of the casing.

The invention will be better understood and other particular features and advantages will become apparent with the help of the description below and the appended drawings, given by way of example, where FIG. 1 shows schematically a partial profile view of a preferred embodiment of the inside of a liquid crystal optical display head according to the invention.

In an optical display head, three heat exchange modes exist so as to allow the extraction of the energy dissipated as heat from the lamps. These three heat exchange modes are respectively radiation, convection and conduction. In an optical display head according to the known prior art, already described, the convection is forced convection provided by forced ventilation; it is this forced convection which in this solution extracts most of the energy dissipated as heat from the lamps. In an optical display head according to the invention, there is no forced convection since the forced ventilation has been removed; the only form of convection remaining is natural convection which is less effective than forced convection. To compensate for the removal of the forced convection, several solutions are possible, including increasing the temperature resistance of the elements of the optical display head or improving one of the aforementioned heat exchange modes so as to compensate for the removal of the forced convection. The radiation and/or the natural convection and/or the conduction may thus be improved. In the optical display head according to the invention, it is mainly the conduction which is improved. Heat conduction is improved by modifying the heat sink. The modified heat sink is the heat sink located in the vicinity of the lamps and responsible for extracting the energy dissipated as heat from the lamps; moreover, the optical head may comprise other additional heat sinks. In the modified heat sink, it is its material and/or its structure which can thus be modified. In the optical display head according to the invention, the structure of the heat sink has been modified; specifically, instead of being associated with a plastic rack as in an optical head according to the prior art, the heat sink in an optical head according to the invention is a part made from a single type of heat conducting material, preferably metal, in order to improve the thermal conductivity of the heat sink, the heat sink including the rack which holds the lamps. The single piece nature of the structure of the heat sink in the optical head according to the invention, where the heat sink extends from the lamp covers to the outside of the casing and is designed to be in contact with the aircraft instrument panel or with another device once the optical head is mounted, is particularly important for improving the removal of energy dissipated as heat from the lamps towards the outside of the casing of the optical head and toward the instrument panel to which the optical head is connected once the optical head is mounted in the aircraft or in another device. The energy dissipated as heat from the lamp is extracted into the heat sink, either directly in the case of the free parts of the lamps, or after passing via the covers in the case of those parts of the lamps which are surrounded by the covers. From the free central parts of the lamps or from the covers surrounding the extreme parts of the lamp, to the instrument panel, the heat sink is made of one piece, thus reducing as much as possible the number of heat interfaces on the path for removing energy dissipated as heat from the lamps toward the outside of the casing of the optical head and toward the instrument panel.

FIG. 1 shows schematically a partial profile view of a preferred embodiment of the inside of a liquid crystal optical display head according to the invention. The optical head is shown mounted on the instrument panel of a device which preferably is an aircraft. The optical head shown in FIG. 1 is cut by three axes, one axis a in chain line and two axes in dotted line, the axis AA and the axis BB, respectively. The part of the optical head located above the axis AA is not shown since it is symmetrical with respect to the axis a with the part of the optical head located below the axis BB. An orthonormal coordinate system defined by the axes X, Y, Z is shown in FIG. 1, the plane of the screen of the assembly comprising the liquid crystal matrix being parallel to the YZ plane. The axes AA, BB are parallel to the X axis.

The optical head has a casing 1. The casing 1 has several parts, among which a side part 12 of the casing 1 and an angular part 13 of the casing 1 are shown. Other casing parts, not needed for understanding the invention, are not shown and/or are not referenced. The optical head is fastened to an instrument panel 2 by fastening means not shown in FIG. 1. The optical head is shown mounted on the instrument panel 2, but the instrument panel 2 does not belong to the optical head. The instrument panel 2 is, for example, made of metal or of a thermally and electrically conducting composite. The optical head is fastened to the instrument panel 2 via a heat sink 8. Glass lamps 6 illuminate an assembly comprising the liquid crystal matrix 3. The pilot looking at the screen of the assembly comprising the liquid crystal matrix 3 is located on the right-hand side of FIG. 1, but he is not shown in FIG. 1. The heat sink 8 is located behind the lamps 6. The heat sink 8 is made of metal. The heat sink 8 has a certain depth along the Z axis. In its extreme parts in the direction of the depth along the Z axis, as in FIG. 1, the heat sink 8 has crenels 81 in which the lamps 6 are placed. In the central part of the heat sink 8, in the direction of the depth along the Z axis, which central part is not visible in FIG. 1, the face of the heat sink 8 next to the lamps is flat and the tube-shape lamps 6 are not in contact with the heat sink 8. All the tube-shape lamps 6 may be replaced by a single coil-shaped lamp. At the extreme parts of the heat sink 8, the lamps 6 are surrounded by covers 7 in order to prevent direct contact between the glass of the lamps 6 and the metal of the heat sink 8, a contact which would involve a risk of the glass breaking when the optical head is subjected to vibration during aircraft flight. The covers 7 are located in the crenels 81. The height of the covers is, for example, between 8 mm and 10 mm in the direction of the depth along the Z axis. Together, the crenels 81 form the rack in which the lamps 6 are placed. The heat sink 8 is a single part, from the crenels 81 located in contact with the covers 7 to the part of the heat sink 8 which is fastened to the instrument panel 2. The angular parts 82 of the crenels 81 have circular fillets. The lamps 6 emit light energy. The emitted light energy is shown by zigzag arrows. A significant part of this emitted light energy is dissipated thermally, that is to say in the form of heat, into the heat sink 8, this part of the energy being called thermally dissipated energy ED. A part of the thermally dissipated energy ED is extracted via the heat sink to the outside of the casing 1, that is to say either to the instrument panel 2 or to the outer surfaces of the side 12 and angular 13 parts, it is the extracted energy EE which is shown by arrows in solid lines. The energy extracted to the outer surfaces of the side 12 and angular 13 parts of the casing 1 then continues to be extracted by natural convection. The energy evacuated to the instrument panel 2 then continues to be extracted either by conduction in the instrument panel 2 or by natural convection. The lamps 6 are held in the rack of the heat sink 8 by an interconnection strip 4. The lamps 6, which are powerful, operate by day, while at night they are switched off; night lamps 9, which are fewer and less powerful, operate at night. Infrared filters 5 are placed in front of the night lamps 9. The shape of the heat sink 8 is a shape having a U-shaped profile with outward rims coming out of the casing 1 and coming into contact with the instrument panel 2. A first electronic card 11, for switching the lamps on and off, preferably having an L-shaped profile but which could also have an I-shaped profile, and a second electronic card 10 for driving the assembly comprising the liquid crystal matrix 3, having an I-shaped profile, are placed in the hollow of the U, so as to take up minimum volume. The L has one arm parallel to the X axis and one to the Y axis, while the I is parallel to the Y axis. Several lateral cards 14 for driving the assembly comprising the liquid crystal matrix 3 are placed parallel to the arms of the U. The lateral electronic cards 14 for driving the assembly comprising the liquid crystal matrix 3 are fairly low bulk since the bulky electronics has been carried over to the second electronic card 10 for driving the assembly comprising the liquid crystal matrix 3. This optimizes the overall size of the optical head.

More generally, and independently of the preferred embodiment described in FIG. 1, the optical head is designed to be connected to the instrument panel 2 and is preferably designed to be fastened to the instrument panel 2 via the heat sink 8, whose U-shaped profile with rims toward the outside, the rims advantageously being parallel to the central part of the U, allows good heat conduction to the instrument panel 2 and withstands mechanical stresses well.

Preferably, the optical head does not have forced ventilation. Removal of the forced ventilation has the advantage of increasing the reliability of the cooling function in the optical head by a significant decrease in the risk of bringing dust inside the optical head. Removing the forced ventilation also has the advantage of removing the risk of directly ventilating the lamps 6: such direct ventilation would have the drawback of considerably shortening the life of the lamps 6. Removing the forced ventilation also has the advantage of reducing noise in the vicinity of the optical head by removing the airstream in the optical head and by decreasing the total airstream past the liquid crystal display if the electronic card tray associated with the optical head and contained in the liquid crystal display still requires forced ventilation which will then be exclusively dedicated thereto. Furthermore, the removal has the advantage of reducing the energy consumption of the optical head and consequently reducing the total consumption of the liquid crystal display. In a preferred embodiment, such as for example that of FIG. 1, the heat sink 8 is structured and placed so as to be able to extract more than half of the energy dissipated as heat by the lamps 6.

The central part of that face of the heat sink 8 which is next to the lamps 6 advantageously reflects the light from the lamps 6. Thus, a greater portion of the energy emitted by the lamps 6 may serve to illuminate the screen of the assembly comprising the liquid crystal matrix 3 and consequently, may increase the overall energy efficiency of the optical head.

The extreme parts of that face of the heat sink which is next to the lamps preferably comprise the crenels 81 of a rack in which the lamps 6 are placed, the crenels 81 being in contact with the covers 7. By means of the interconnection strip 4, the lamps 6 are firmly held secured to the heat sink 8 and therefore to the structure of the optical head. The crenels 81 advantageously have fillets in their angular parts 82, in order to prevent the formation of electric arcs between the lamps 6 and the heat sink 8. The fillets are preferably circular and have, for example, a diameter of about one millimeter. The lamps 6 are preferably made of glass.

The heat sink 8 preferably has a dish-shaped profile formed by a U with outward rims located at the free ends of the arms of the U. The rims are preferably parallel to the central part of the U. Advantageously, the heat sink does not have fins in the central part of the U on the inside of the U, which makes it possible to house electronic cards in the hollow of the U, thus decreasing the overall size of the optical head. More specifically, a first electronic card 11 for switching the lamps 6 on and off and a second electronic card 10 for driving the assembly comprising the liquid crystal matrix 3 are preferably placed inside the U, that is to say, in the hollow of the U, the first card 11 having an L-shaped profile, the hollow of the L being placed towards the inside of the U and one of the bars of the L being parallel to the central part of the U, the second card 10 having an I-shaped profile, and the second card 10 being placed in the hollow of the L and parallel to the central part of the U. The central part of the U has a thickness of, for example, about 5 mm, whereas in an optical head according to the prior art, the thickness of the heat sink 8 was only about 2 mm to which however had to be added the 15 mm to 20 mm to give the fins a total size in this direction of about 20 mm, which is much greater than the 5 mm of the heat sink 8 according to the invention: the space thus released now makes it possible to house several electronic cards.

The material of the heat sink is preferably electrically conducting in addition to being heat conducting, and is preferably a metal. Thus, the heat sink 8 connected to the instrument panel 2 may act as a ground connection for some parts of the optical head, the instrument panel 2 acting as the ground. The covers 7 are made so as to provide electrical insulation between the lamps 6 and the heat sink 8. The material of the heat sink is advantageously aluminum.

In an optical head according to the prior art, the material of the covers was silicone. In an optical head according to the invention, the material of the covers contains a filler in order to improve the heat conduction of the covers. Thus, the energy dissipated as heat from the ends of the lamps 6 is easier to extract into the heat sink 8 through the covers 7. The material of the covers is, for example, silicone filled with boron nitride or silicone filled with alumina.

What is claimed is:

1. A liquid crystal optical display head, comprising:
   a casing having a lamp;
   a cover surrounding the lamp; and
   at least one heat sink is made as one piece from a heat conducting material and directly connects the cover to the outside of the casing, the heat sink having a dish-shaped profile formed by a U with outward rims located at the free ends of the arms of the U.
2. The optical head as claimed in claim 1, wherein the optical head is designed to be fastened to an instrument panel via the heat sink.
3. The optical head as claimed in claim 2, wherein the optical head does not have forced ventilation.
4. The optical head as claimed in claim 2, wherein the extreme parts of that face of the heat sink which is next to the lamp comprise the crenels of a rack in which the lamp is placed, the crenel being in contact with the cover.
5. The optical head as claimed in claim 1, wherein the optical head does not have forced ventilation.
6. The optical head as claimed in claim 5, wherein the extreme parts of that face of the heat sink which is next to the lamp comprise the crenels of a rack in which the lamp is placed, the crenel being in contact with the cover.
7. The optical head as claimed in claim 1, wherein the heat sink is structured and placed so as to be able to extract more than half of the energy dissipated as heat by the lamp.
8. The optical head as claimed in claim 7, wherein the extreme parts of that face of the heat sink which is next to the lamp comprise the crenels of a rack in which the lamp is placed, the crenel being in contact with the cover.
9. The optical head as claimed in claim 1, wherein the central part of that face of the heat sink which is next to the lamp reflects the light from the lamp.
10. The optical head as claimed in claim 9, wherein the extreme parts of that face of the heat sink which is next to the lamp comprise the crenels of a rack in which the lamp is placed, the crenel being in contact with the cover.
11. The optical head as claimed in claim 1, wherein the extreme parts of that face of the heat sink which is next to the lamp comprise the crenels of a rack in which the lamp is placed, the crenel being in contact with the cover.
12. The optical head as claimed in claim 11, wherein the crenels have fillets in their angular parts.
13. The optical head as claimed in claim 12, wherein the fillets are circular and have a diameter of about one millimeter.
14. The optical head as claimed in claim 1, wherein the heat sink does not have fins in the central part of the U on the inside of the U.
15. The optical head as claimed in claim 14, wherein a first electronic card for switching the lamp on and off and a second electronic card for driving the assembly comprising the liquid crystal matrix are placed inside the U, the first card having an L-shaped profile, the hollow of the L being placed towards the inside of the U and one of the bars of the L being parallel to the central part of the U, the second card having an I-shaped profile, and the second card being placed in the hollow of the L and parallel to the central part of the U.
16. The optical head as claimed in claim 1, wherein central part of the U has a thickness of about 5 mm.
17. The optical head as claimed in claim 1, wherein the material of the heat sink is metallic.
18. The optical head as claimed in claim 1, wherein the material of the covers contains a filler in order to improve the heat conduction of the cover.
19. The optical head as claimed in claim 18, the material of the cover is silicone filled with boron nitride or silicone filled with alumina.

* * * * *